Jan. 19, 1932.  T. R. FREITAG ET AL  1,842,260
SPUD AND PLUG ASSEMBLY
Filed April 28, 1928

Inventors
T. R. Frietag,
K. W. Mardersteck,

By Jack P. Richmond
Attorney

Patented Jan. 19, 1932

1,842,260

UNITED STATES PATENT OFFICE

THEODORE R. FREITAG AND KARL W. MARDERSTECK, OF SHARON, PENNSYLVANIA; SAID MARDERSTECK ASSIGNOR TO THE PETROLEUM IRON WORKS COMPANY, OF SHARON, PENNSYLVANIA, A CORPORATION OF OHIO

SPUD AND PLUG ASSEMBLY

Application filed April 28, 1928. Serial No. 273,613.

The invention relates to closures for metal barrels and the like and more particularly to spud and plug assemblies.

Objects are to simplify the construction with the view to making for permanence and minimizing replacements; to provide a practical ground seat which will insure a liquid and vapor tight connection; to provide for renewing the sealing gasket without renewing the plug; to provide positive means for locking the plug; and to provide means for concealing the lock and of such nature as to operate as a tell-tale in the event of pilferage.

With such and other objects in view, the nature, characteristic features and scope of the invention will more readily be understood from the following description taken in connection with the accompanying drawings forming a part hereof, wherein Figure 1 is a plan view of the improved spud and plug assembly.

Figure 1:
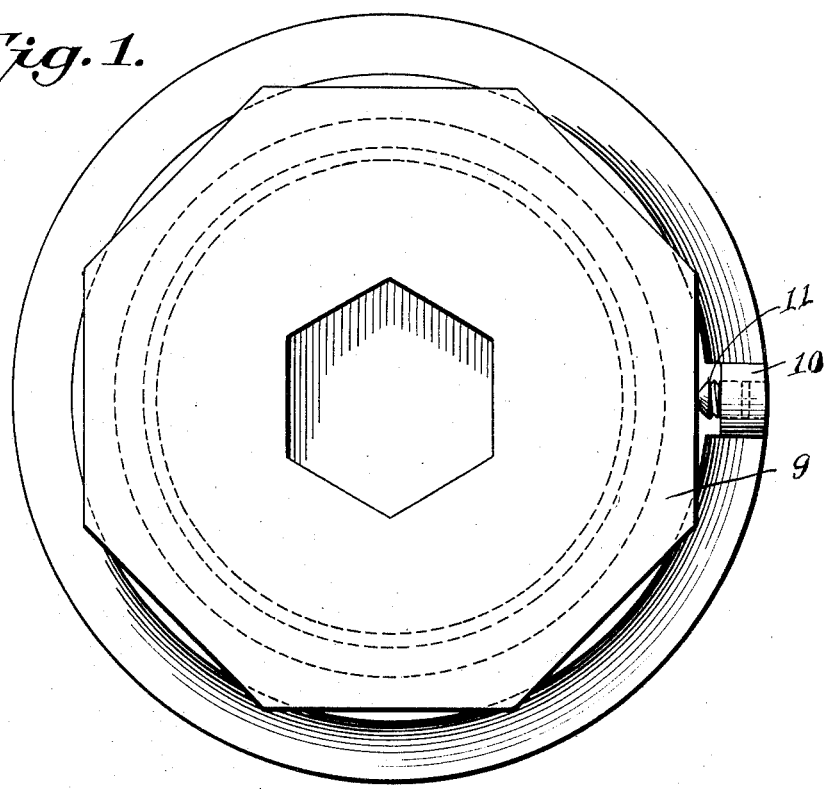
Figure 2:
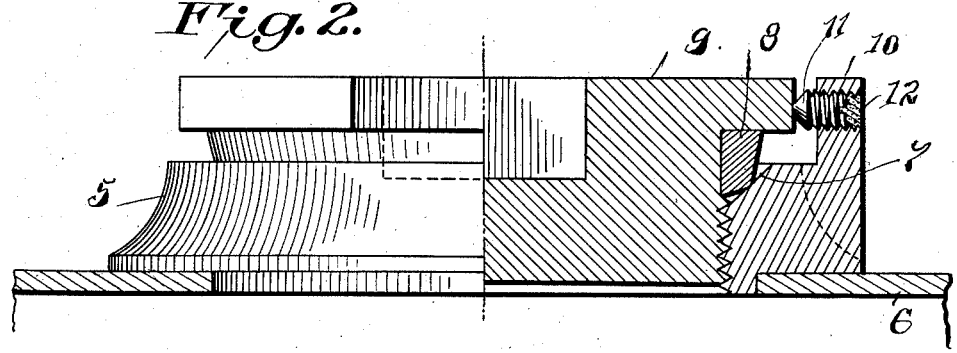
Fig. 2 is a sectional elevational view thereof.

Referring to the drawings, the numeral 5 represents a spud or trim for the opening of a metal barrel 6, the spud and barrel being joined by welding or in any other approved manner. Beyond its screw threaded portion the spud is formed with a ground and tapered seat 7 designed to cooperate with a sealing gasket 8. The latter is by preference a ring of soft or plastic metal, such as lead, carried by the plug 9 and lodged against the shouldered portion thereof. Evidently the gasket readily is susceptible of removal and replacement when it has outlived its usefulness. The construction and arrangement of the parts are such that the outer edge of the gasket is first to contact with the tapered ground seat of the spud.

The spud is formed with an ear 10 rising from the margin thereof to a point substantially flush with the crown of the plug when the latter is in sealing position. The ear is drilled and tapped for the reception of a set screw 11 designed to impinge upon one of the angular faces of the plug and to prevent the latter from backing up or working loose as often happens with ordinary plugs due to jars in transportation or to expansion and contraction of the metal under changing climatic conditions. The set screw is so proportioned that it completely enters the tapped hole and forms a blind cavity in its wake which is filled, as at 12, with sealing wax or other suitable material. The undisturbed or intact condition of the latter on the arrival of the container is a reasonable indication that the plug has not been tampered with.

Figure 3:
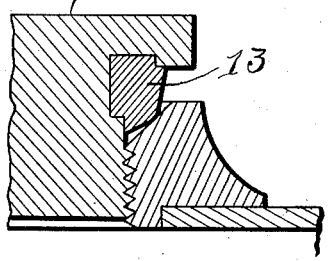
Fig. 3 is a sectional detail of a modification.

Fig. 3 shows a varied form of construction wherein the sealing gasket 13 is cast in an undercut channel or recess provided in the plug 14.

Having described our invention, we claim—

1. A plug and spud assembly for shipping drums and the like, comprising the combination of a spud and plug having coordinate sealing provisions, and whereof one is equipped with a support cored at right angles to the other, a stud penetrating said cored portion and impinging against the other element to prevent angular movement thereof, in which position its head is below the mouth of the core, and a filling to conceal the head of the stud.

2. A plug and spud assembly for shipping drums and the like, comprising the combination of a spud and plug having coordinate sealing provisions, including a replaceable gasket arranged so as to space the head of the plug with respect to the spud, the spud having a riser substantially flush with the top of the plug, and an abutment movable transversely of the riser to engage the periphery of the plug and effective as a telltale.

In testimony whereof we affix our signatures.

THEODORE R. FREITAG.
KARL W. MARDERSTECK.